(12) United States Patent
Zimmerman et al.

(10) Patent No.: US 11,541,473 B2
(45) Date of Patent: Jan. 3, 2023

(54) CUTTING TORCH GUIDE STRUCTURE AND CUTTING TORCH GUIDE SYSTEM

(71) Applicants: Todd Zimmerman, Highland, CA (US); Dennis J. Cory, Beaumont, CA (US)

(72) Inventors: Todd Zimmerman, Highland, CA (US); Dennis J. Cory, Beaumont, CA (US)

( * ) Notice: Subject to any disclaimer, the term of this patent is extended or adjusted under 35 U.S.C. 154(b) by 351 days.

(21) Appl. No.: 16/913,625

(22) Filed: Jun. 26, 2020

(65) Prior Publication Data

US 2020/0406384 A1    Dec. 31, 2020

Related U.S. Application Data

(60) Provisional application No. 62/868,788, filed on Jun. 28, 2019.

(51) Int. Cl.
| | |
|---|---|
| *B23K 7/10* | (2006.01) |
| *B23K 37/02* | (2006.01) |
| *B23K 10/00* | (2006.01) |

(52) U.S. Cl.
CPC .......... *B23K 7/102* (2013.01); *B23K 37/0264* (2013.01); *B23K 7/105* (2013.01); *B23K 7/107* (2013.01); *B23K 10/00* (2013.01)

(58) Field of Classification Search
None
See application file for complete search history.

(56) References Cited

U.S. PATENT DOCUMENTS

| | | | | | |
|---|---|---|---|---|---|
| 2,813,710 | A | * | 11/1957 | Angle | B23K 7/105 33/DIG. 1 |
| 3,682,265 | A | * | 8/1972 | Hiraoka | H01F 7/20 73/635 |
| 2009/0256320 | A1 | * | 10/2009 | Harris | B23Q 9/0042 335/219 |
| 2020/0406384 | A1 | * | 12/2020 | Zimmerman | B23K 7/102 |

* cited by examiner

*Primary Examiner* — Scott R Kastler
(74) *Attorney, Agent, or Firm* — Loza & Loza, LLP; Michael I. Angert

(57) ABSTRACT

Cutting torch guide structures, systems, and kits include a base structure having a bottom surface and a channel formed in the base structure, a mechanically switched permanent magnet coupled to the base structure and configured to mechanically switch between two magnetic states, and a cutting torch guide structure configured to be releasably received in the channel and magnetically coupled to the base structure by magnetic attraction between a at least one permanent magnet fixed in at least one recess in the channel and a guide structure permanent magnet fixed to the cutting torch guide structure, where the cutting torch guide structure is configured with a first portion that is removable received in the channel of the base structure and a second portion that overhangs the base structure and includes an edge that defines a predefined shape and is configured to be in slidable contact with a cutting torch tip.

20 Claims, 10 Drawing Sheets

CUTTING TORCH GUIDE STRUCTURE AND CUTTING TORCH GUIDE SYSTEM

PRIORITY CLAIM

This application claims priority to and the benefit of Provisional Patent Application No. 62/868,788 filed in the United States Patent and Trademark Office on Jun. 28, 2019, the entire content of the prior applications is incorporated herein by reference as if fully set forth below in its entirety and for all applicable purposes.

TECHNICAL FIELD

The apparatus described herein relates to physical guides and/or templates (individually and collectively referred to herein as a "guide" and "guides," respectively) used to guide a cutting torch while the cutting torch is burning through a metallic object. The system described herein relates to a structure configured to couple to the metallic object and one or more guides that are interchangeable with the structure.

INTRODUCTION

Apparatus used to cut metal include cutting torches that use oxygen and a fuel, such as acetylene, gasoline, hydrogen, methylacetylene-propadiene (MAPP), propylene, or propane. As described in *The Oxy-Acetylene Handbook*, Union Carbide Corp 1975, a cutting torch heats metal to its kindling temperature whereupon a stream of oxygen may then be trained on the metal, burning it into a metal oxide that flows out of the kerf (a slit or notch made by the cutting torch) as slag. These types of double tank cutting torches may be referred to by the types of fuel they use (e.g., oxygen-acetylene or oxyacetylene cutting torches). For ease of reference herein, such a cutting torch will be referred to as an "oxy-fuel" cutting torch.

Apparatus used to cut metal include plasma cutters (also referred to as plasma torches). A plasma cutter is an apparatus used to cut through an electrically conductive material (e.g., a metal workpiece) using an accelerated jet of hot plasma. The plasma cutter and the metal workpiece share a common electrical ground. In operation, a compressed gas (e.g., oxygen, air, or some inert gas, depending on material being cut) is blown through a focused gas nozzle at high speed toward the metal workpiece. An electrical arc forms within the gas, between an electrode near or integrated into the gas nozzle and the metal workpiece. The electrical arc ionizes some of the gas, thereby creating an electrically conductive channel of plasma. As electricity travels from the plasma cutter to the metal workpiece via the plasma. The electrical arc touches the metal workpiece and generates enough heat to melt the metal workpiece. The accelerated jet of hot plasma and compressed gas blow the molten metal away, thereby cutting through the metal workpiece.

The above-mentioned apparatus may be handheld. In operation, they cast a brilliant light. The light is so bright that persons operating oxy-fuel cutting torches and plasma cutters must wear very dark optical filters. The combination of brilliant light and dark optical filters makes it difficult to see marks, made by chalk or spray-paint, left on the metal. Such marks may be left to show where, and in what shape, to cut the metal. Furthermore, when handheld, because of their configurations and/or weight, it may be difficult for an operator to maintain a line of a cut (without regard to whether the line is straight or curved) throughout an entire cutting process (e.g., the process of cutting out a shape, such as a circle, square, or rectangle). Some accessories to assist an operator during the cutting process may exist (e.g., a "chariot" that holds a tip of an oxy-fuel cutting torch a predetermined distance from the surface of the metal being cut, and is wheeled to allow the operator to move or translate the tip in a given direction), however, they are difficult or time consuming to use.

Accordingly, guides that can be quickly and easily coupled to a metal workpiece, without a use of a mechanical clamp, tack-welding, or an electromagnet (a device that exhibits a magnetic field when energized with electricity) and which aids an operator in maintaining a line of a cut during a cutting operation are desired and needed. Additionally, a system that can affect a quick and easy change to the shape and size of a guide is also desired and needed.

These and other aspects will become more fully understood upon a review of the detailed description, which follows. Other aspects and features will become apparent to those of ordinary skill in the art, upon reviewing the following description of specific, exemplary aspects in conjunction with the accompanying figures. While features may be discussed relative to certain examples and figures below, all embodiments described herein can include one or more of the advantageous features discussed herein. In other words, while one or more embodiments may be discussed as having certain advantageous features, one or more of such features may also be used in accordance with the various embodiments and aspects discussed herein. In similar fashion, while exemplary embodiments may be discussed below as device, system, or method embodiments such exemplary embodiments can be implemented in various devices, systems, and methods.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example a cutting torch guide base is disclosed. The cutting torch guide base includes a base structure having a top surface and an opposing bottom surface, a mechanically switched permanent magnet that is fixed to the top surface of the base structure, has a working surface that is substantially coplanar with the bottom surface of the base structure, and is configured to releasably fix the apparatus to a metal workpiece, a channel formed in and defined by first interior sidewalls of, and a channel floor within, the base structure, at least one recess located in the channel and defined by second interior sidewalls of, and a recess floor within, the base structure, the recess floor located between the channel floor and the bottom surface, and having an opening to the channel defined by a second edge between the channel floor and the second interior sidewalls, and at least one permanent magnet fixedly received in the at least one recess, a thickness of the at least one permanent magnet is less than a distance between the channel floor and the bottom surface of the base structure. According to one aspect, the channel has predefined fixed proportions configured to interchangeably receive a first portion of any one of a plurality of cutting torch guide structures and the at least one permanent magnet is configured to releasably fix the any one of the plurality of cutting torch guide structures to the base structure within the channel.

In another example, cutting torch guide system is disclosed. The cutting torch guide system includes a base structure having a top surface and an opposing bottom surface and a channel formed in the base structure, a mechanically switched permanent magnet coupled to the base structure and configured to mechanically switch between a first magnetic state, having a first magnetic field strength that fixes the base structure to a metal workpiece and a second magnetic state, having a second magnetic field strength that releases the base structure from the metal workpiece, and at least one cutting torch guide structure configured to be releasably received in the channel and magnetically coupled to the base structure by magnetic attraction between at least one permanent magnet fixed in at least one recess in the channel of the base structure and a guide structure permanent magnet fixed to the at least one cutting torch guide structure, wherein the at least one cutting torch guide structure is configured with a first portion that is removable received in the channel of the base structure and a second portion that overhangs the base structure and includes an edge that defines a predefined shape and is configured to be in slidable contact with a cutting torch tip.

In still another example, a kit for a cutting torch guide system is disclosed. The kit includes a base structure having a top surface, an opposing bottom surface, and a channel formed in and defined by first interior sidewalls of the base structure and a channel floor within the base structure, a mechanically switched permanent magnet that is fixed to the base structure, has a working surface that is substantially coplanar with the bottom surface of the base structure, and is configured to releasably fix the base structure to a metal workpiece by physical rotation of a first internal permanent magnet relative to a second internal permanent magnet within a housing of the mechanically switched permanent magnet, at least one permanent magnet fixedly received in at least one recess in the base structure, a thickness of the at least one permanent magnet is less than a distance between the channel floor and the bottom surface of the base structure, and at least one cutting torch guide structure. The at least one cutting torch guide structure includes a first portion configured to be releasably received in the channel, and a second portion that overhangs the base structure, is spaced apart laterally from the base structure, and includes an edge that defines a predefined shape, wherein the edge is configured to be slidably contacted by a cutting torch tip of a cutting torch to guide the cutting torch tip while cutting the predefined shape from the metal workpiece.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

Various features, nature, and advantages may become apparent from the detailed description set forth below when taken in conjunction with the drawings in which like reference characters identify correspondingly throughout.

FIG. 4 is comprised of FIG. 4A and FIG. 4B.

FIG. 8 is comprised of FIG. 8A and FIG. 8B.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form to avoid obscuring such concepts.

While aspects and embodiments are described in this application by illustration to some examples, those skilled in the art will understand that additional implementations and use cases may come about in many different arrangements and scenarios. While some examples may or may not be specifically directed to use cases or applications, a wide assortment of applicability of described innovations may occur. In some practical settings, devices incorporating described aspects and features may also necessarily include additional components and features for implementation and practice of claimed and described embodiments.

Figure 1A:
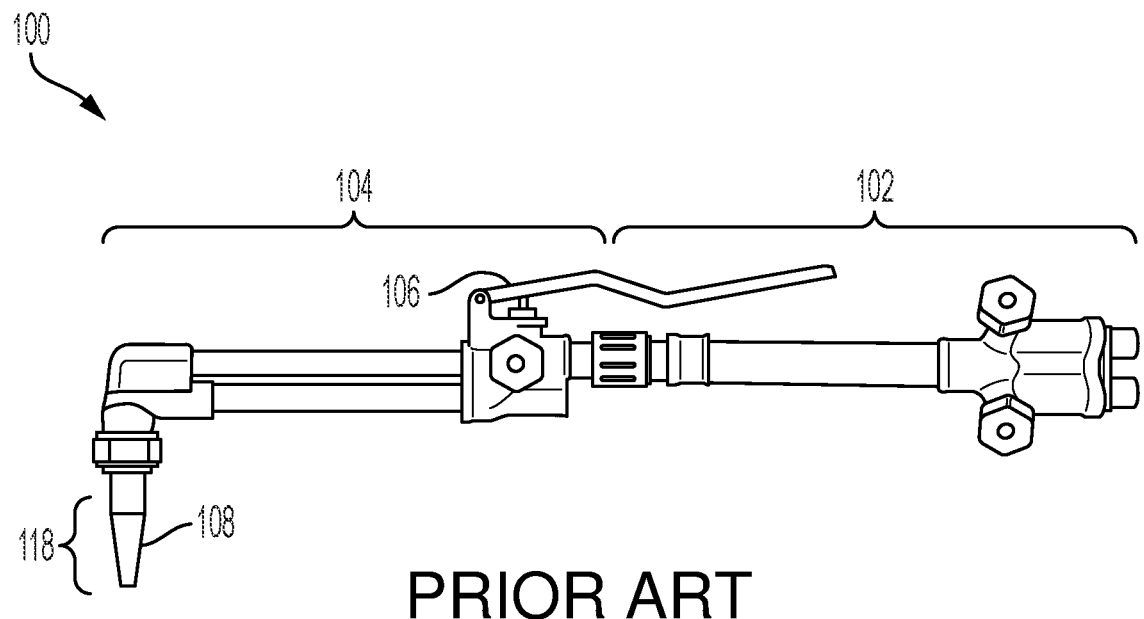
FIG. 1A depicts an oxygen-acetylene cutting torch.
Figure 1B:
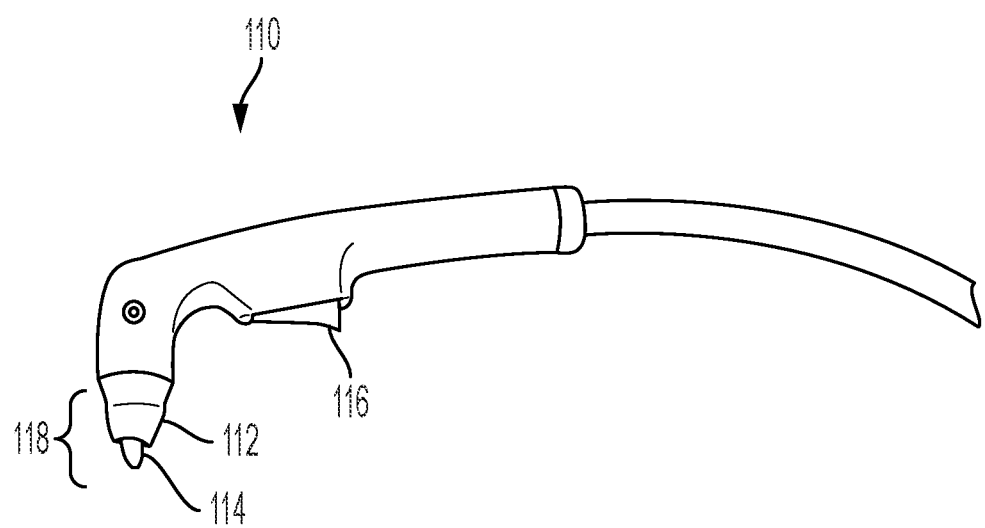
FIG. 1B depicts a plasma cutting torch.

FIG. 1A depicts an oxygen-acetylene cutting torch. The oxygen-acetylene cutting torch is an example of an oxy-fuel cutting torch 100. The oxy-fuel cutting torch 100 includes a torch handle 102, a cutting torch 104 with and oxygen-blast valve and lever 106, and an oxy-fuel cutting torch tip 108. FIG. 1B depicts a plasma cutting torch 110. The plasma cutting torch 110 includes a gas diffuser or shield 112, a plasma cutting tip 114, a trigger 116 and a consumable electrode (not shown). As used herein, the oxy-fuel cutting torch 100 and the plasma cutting torch 110, are examples of, and will be individually and collectively referred to as "cutting torches." As used herein, the oxy-fuel cutting torch tip 108 and either or both of the gas diffuser or shield 112 and plasma cutting tip 114, are examples of, and will be individually and collectively referred to as a cutting torch tip 118 or cutting torch tips 118. According to aspects described herein, reference to a cutting torch tip 118 is a reference to an outside surface that is adjacent to and spaced behind an end of the cutting torch from which, for example, fuel is expelled and ignited or a plasma is generated.

Described herein are apparatus and systems configured to releasably hold a cutting torch guide structure above a metal workpiece. As used herein, the metal workpiece may be a ferrous metal workpiece, be a workpiece that includes a ferrous metal, or a non-ferrous metal workpiece that has a ferrous metal block placed adjacent to a rear side of the non-ferrous metal workpiece. A cutting torch will be used to cut out a shape from, or open a slot in, the metal workpiece. A cutting torch guide structure, examples of which are described and illustrated herein, may be used to as templates that have the same shape and size (with appropriate offset distance to account for a diameter of the cutting torch tip 118) as an opening that is desired to be cut in the metal workpiece. In operation, an operator may use an apparatus to hold the cutting torch guide structure above the metal workpiece. The operator, with the cutting torch in an operational state (e.g., emitting flame as in an oxy-fuel cutting torch or generating a plasma as in a plasma cutting torch) can slide a cutting torch tip 118 along an edge (e.g., an interior or an exterior edge) of the cutting torch guide structure to produce a cut-out of a desired shape and size.

Figure 2:
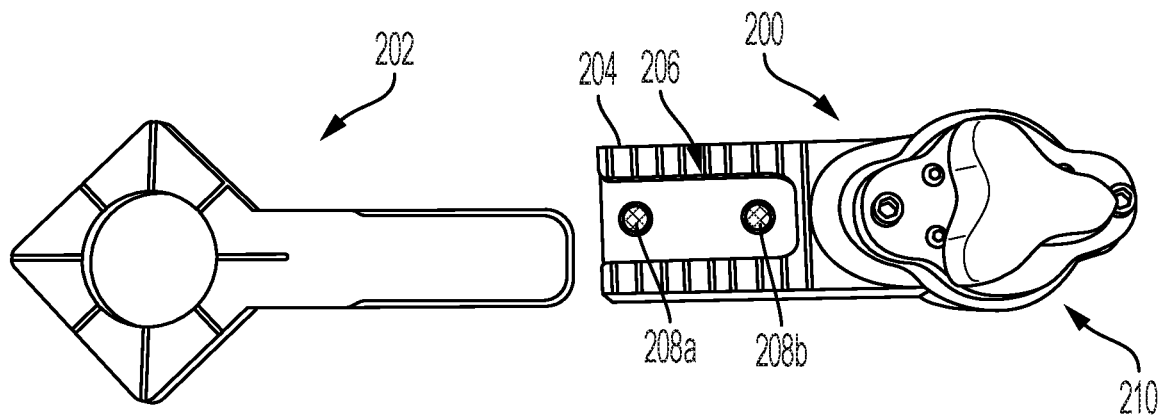
FIG. 2 depicts an exemplary apparatus configured to removably receive a plurality of interchangeable cutting torch guide structures and an exemplary cutting torch guide structure, according to aspects described herein.

FIG. 2 depicts an exemplary apparatus 200 (e.g., a base structure 204) configured to removably receive a plurality of interchangeable cutting torch guide structures and an exemplary cutting torch guide structure 202, according to aspects described herein. It is noted that the exemplary apparatus 200 may be comprised of a base structure 204 having a channel 206 therein with at least one permanent magnet in the channel 206 (where the exemplary apparatus 200 includes both a first permanent magnet 208a and a second permanent magnet 208b) and a mechanically switched permanent magnet 210 fixed to the base structure 204. Mechanically switched permanent magnets may be obtained, for example, from Magswitch Technology Inc. of Lafayette, Colo.

Figure 3:
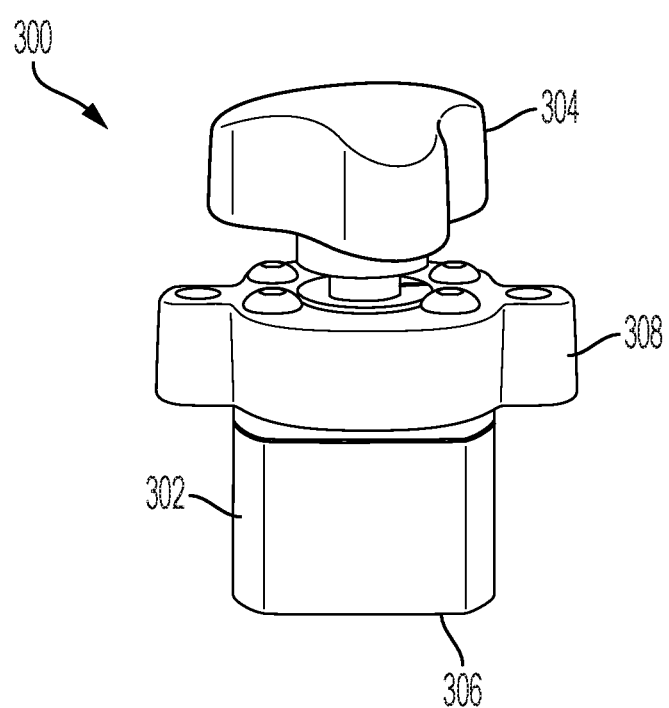
FIG. 3 depicts an example of a mechanically switched permanent magnet.

FIG. 3 depicts an example of a mechanically switched permanent magnet 300 (similar to mechanically switched permanent magnet 210 of FIG. 2). The mechanically switched permanent magnet 300 includes a housing 302. The housing 302 may include a first internal permanent magnet (hidden from view within the housing 302) and an actuating structure 304 fixed to the first internal permanent magnet and configured to rotate the first internal permanent magnet within the housing 302 relative to a second internal permanent magnet (hidden from view within the housing 302) fixed to the housing 302 and adjacent to the first internal permanent magnet. Mechanically rotating the actuating structure 304 may cause the mechanically switched permanent magnet 300 to be in an ON or and OFF state (e.g., to change the magnetic field intensity of the mechanically switched permanent magnet 300 from a strong intensity to a weak intensity (relative to the strong intensity). Rotating the actuating structure 304 may cause the north and south poles of the first and second internal permanent magnets to be aligned adjacent to one another resulting in a first magnetic field having a first magnetic field strength at the working surface 306 (e.g., a bottom surface of the housing 302 and/or a bottom surface of the second internal permanent magnet if exposed) of the mechanically switched permanent magnet 300. Alternatively, rotating the actuating structure 304 may cause the north poles of the first and second internal permanent magnets to be aligned adjacent to one another resulting in a second magnetic field having a second magnetic field strength at the working surface 306 of the mechanically switched permanent magnet 300, In the preceding example, the first magnetic field strength is greater than the second magnetic field strength.

As used herein, a mechanically switched permanent magnet (e.g., 300, 803) is distinct from a first permanent magnet (e.g., 208a, 830), a second permanent magnet (208b, 831), an at least one permanent magnet, and a guide structure permanent magnet, all as recited herein. In other words, the terms a permanent magnet, a first permanent magnet, a second permanent magnet, at least one permanent magnet, and a guide structure permanent magnet, all as used herein are understood to identify a permanent magnet that is not mechanically switched and that is not included in a mechanically switched permanent magnet (e.g., 300, 803).

Figure 4A:
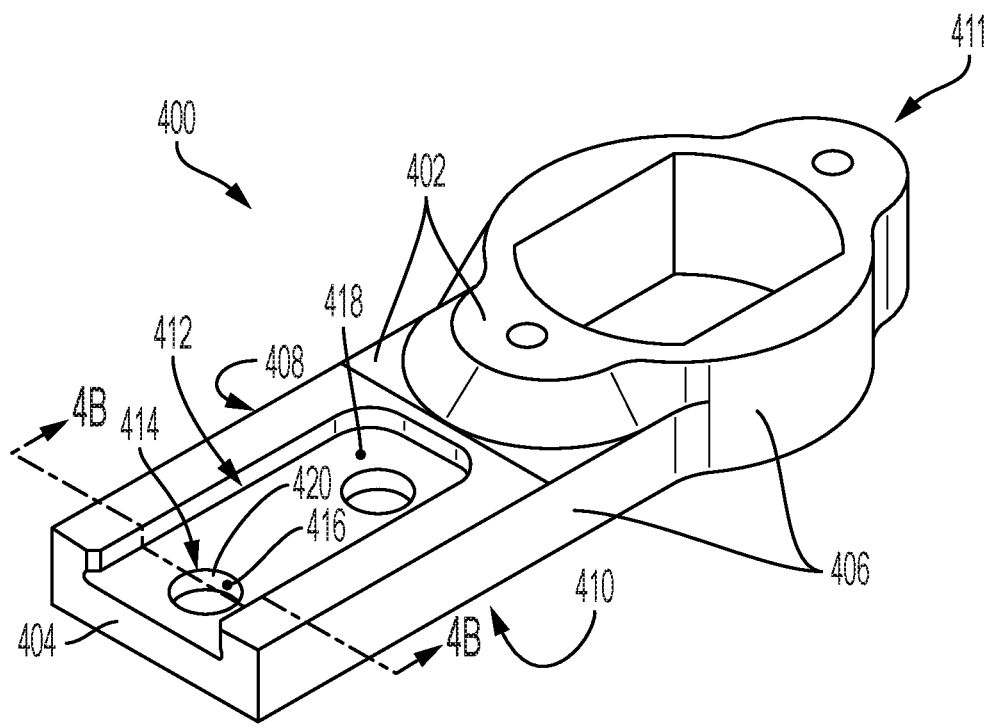
FIG. 4A depicts a base structure of an apparatus configured to interchangeably and releasably fix a cutting torch guide structure over a metal workpiece, according to aspects described herein.
Figure 4B:
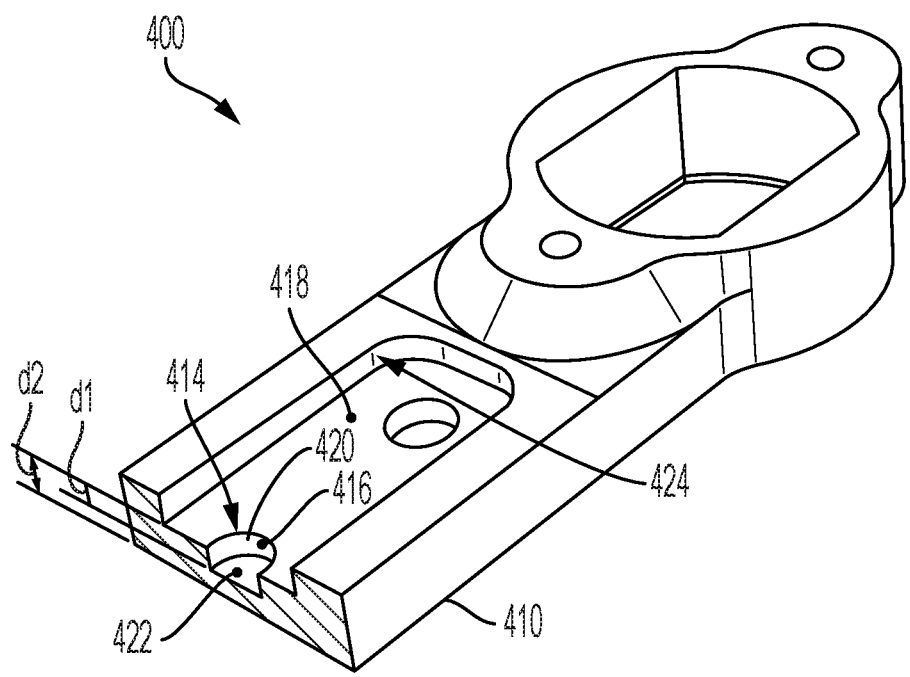
FIG. 4B depicts the base structure of FIG. 4A with a portion of the front side cut-away across the line 4B-4B (or a plane that includes the line 4B-4B) to reveal an exemplary cross section of the base structure and an internal view of the recess, according to aspects described herein.

FIG. 4 is comprised of FIG. 4A and FIG. 4B. FIG. 4A depicts a base structure 400 of an apparatus configured to interchangeably and releasably fix a cutting torch guide structure (not shown) over a metal workpiece (not shown), according to aspects described herein. In the exemplary aspect of FIG. 4A, the metal workpiece would be located under the base structure 400 and may be in contact with a bottom surface 410 of the base structure 400. The base structure 400 may have six sides including a top side (referred to herein as a top surface 402), a front side 404, a right side 406, a left side 408 (hidden from view), a bottom side (referred to herein as a bottom surface 410) (hidden from view), and back side 411. As depicted in the base structure 400, the sides/surfaces may be planar (as exemplified by front side 404) or non-planar (as exemplified by right side 406 and back side 411) or comprise surfaces in multiple planes (as exemplified by top surface 402) or any combination thereof. According to one example, the bottom surface 410 (hidden from view) may be planar (e.g., existing substantially in one plane); however, the bottom surface 410 may have one or more orifices (e.g., openings, holes, cavities) defined by sidewalls within the base structure 400, as will be explained later.

The base structure 400 of the apparatus may have a top surface 402 and an opposing bottom surface 410. The apparatus may include a channel 412 formed in (e.g., shaped, molded, cut, manufactured, included with) and defined by first interior sidewalls 424 (e.g., any one or more of 606, 608, 611 of FIG. 6) of, and a channel floor 418 within, the base structure 400. The channel may have a channel opening spaced apart from (e.g., vertically above and perpendicular to, although perpendicularity is not required) the bottom surface 410 and defined by a first edge bordering the first interior sidewalls 424 and the channel floor 418. At least one recess 414, may be formed in the base structure 400 (e.g., located in the channel 412 within the perimeter of the first interior sidewalls) and below the channel floor 418 and defined by second interior sidewalls 416 of, and a recess floor 422 within, the base structure 400, may be formed in the base structure 400. The recess floor 422 may be located between the channel floor 418 and the bottom surface 410. The at least one recess 414 may be open to the channel 412, having an opening to the channel 412 defined by a second edge 420 between the channel floor 418 and the second interior sidewalls 416 (e.g., where the channel floor 418 and the second interior sidewalls 416 intersect, adjoin, or meet).

As used herein, a sidewall may be referred to in the singular or the plural. For example, an interior sidewall of a cylinder appears as one continuous sidewall (e.g., 416 of FIG. 4). An interior sidewall of a rectangle appears as for contiguous sidewalls. The sidewall of a channel open at one end appears as three contiguous sidewalls (e.g., 606, 608, 611 of FIG. 6). Reference to any one sidewall includes reference to all sidewalls.

FIG. 4B depicts the base structure 400 of FIG. 4A with a portion of the front side 404 cut-away across the line 4B-4B (or a plane that includes the line 4B-4B) to reveal an exemplary cross section of the base structure 400 and an internal view of the at least one recess 414, according to aspects described herein. As illustrated in FIG. 4B, in the exemplary base structure 400, the at least one recess 414 is a blind recess, having its own recess floor 422 (e.g., it is not a through-hole). However, nothing herein prohibits the at least one recess 414 from being a through-hole, or from being a through-hole with a counter-sunk, counter-bored, or other profile. As illustrated in FIG. 4B, in the exemplary base structure 400 of FIGS. 4A and 4B, a first depth (d1) of the at least one recess 414 is less than a distance (d2) between the channel floor 418 and the bottom surface 410 of the base structure 400 (as measured at a location on the channel floor 418 outside of the at least one recess 414).

As illustrated in FIGS. 4A and 4B, the channel 412 may have predefined fixed proportions (e.g., width, length, height) configured to interchangeably receive any one of a plurality of interchangeable cutting torch guide structures (exemplified above by the exemplary cutting torch guide structure 202 of FIG. 2) within the channel 412.

Figure 5:
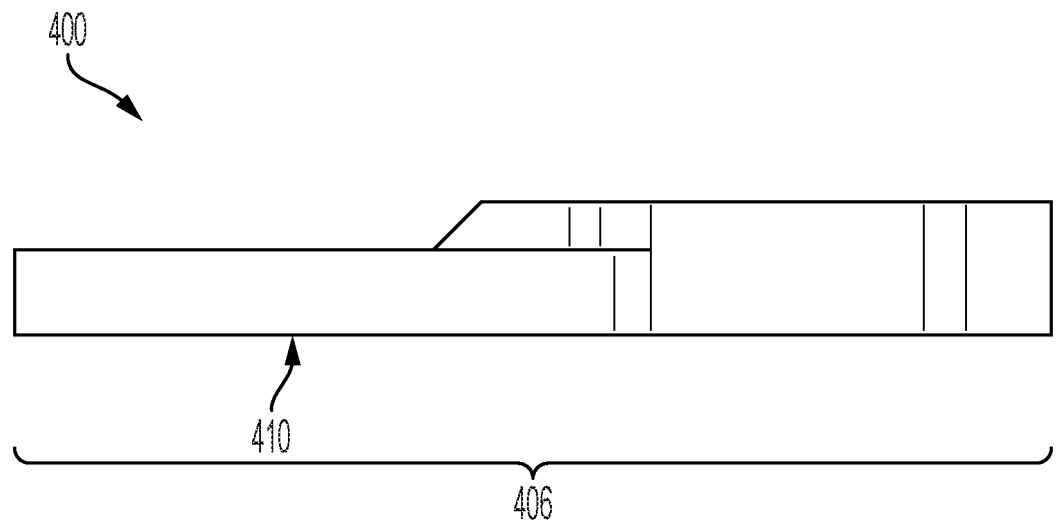
FIG. 5 is a right-side elevation view of the base structure of FIG. 4, according to aspects described herein.

FIG. 5 is a right side 406 elevation view of the base structure 400 of FIG. 4, according to aspects described herein. As depicted in FIG. 5, the bottom surface 410 (depicted as an edge view) may be planar (e.g., existing substantially in one plane). However, non-planar surfaces (e.g., stepped contiguous planar surfaces, curved surfaces, discontinuous or spaced apart surfaces) are within the scope of this disclosure.

Figure 6:
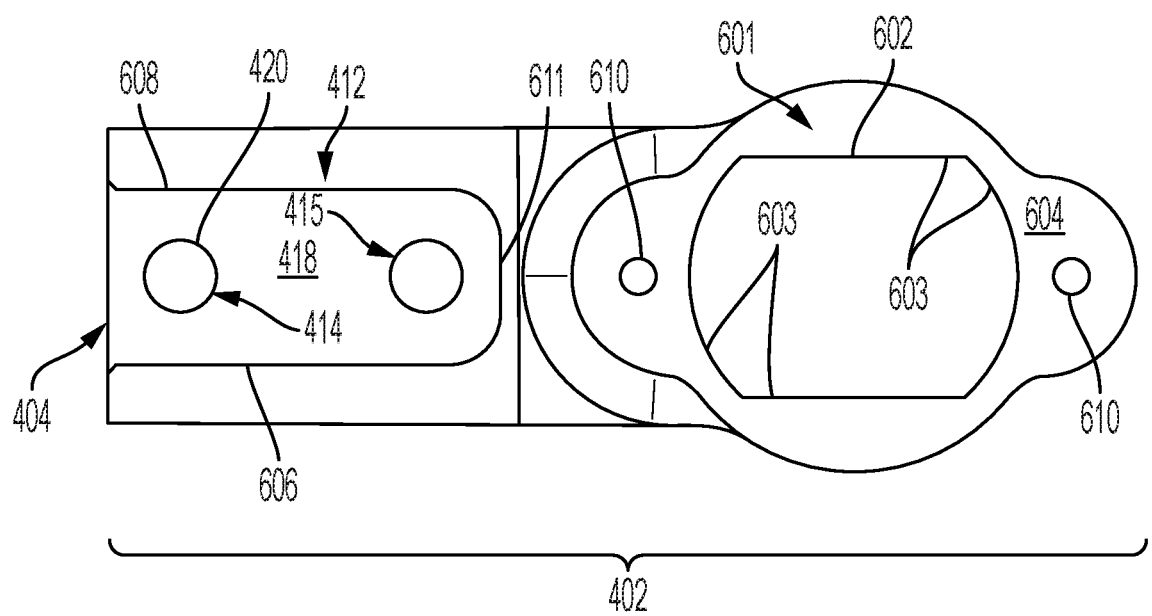
FIG. 6 is a top plan view of the base structure of FIG. 4, according to aspects described herein.

FIG. 6 is a top plan view of the base structure 400 of FIG. 4, according to aspects described herein. The first interior sidewalls 424 of the channel 412 include any one or more of a left interior sidewall 608, back interior sidewall 611, and right interior sidewall 606. The front side 404 of the channel 412 is open, because in the exemplary figures of the disclosure, a cutting torch guide structure (e.g., cutting torch guide structure 202) is configured to enter the channel 412 from the front side 404 and slide toward the back interior sidewall 611 until it is fully inserted and removably secured to the channel 412, for example, by magnetic force of permanent magnets (not shown) fixedly received in the at least one recess 414 and second recess 415 (if present). Although the at least one recess 414 and second recess 415 (i.e., two cavities) are shown in FIGS. 3, 4, and 6, and although each recess may fixedly receive a permanent magnet, the channel 412 may include one or more cavities with each recess fixedly receiving a permanent magnet. Also depicted in FIG. 6, for reference, is the second edge 420 between the at least one recess 414 and the channel floor 418. As previously described the at least one recess 414 may be open to the channel 412, having an opening defined by the second edge 420 of the second interior sidewalls 416 (FIGS. 3 & 4) of the base structure 400 that intersect (e.g., adjoin, meet) the channel floor 418. Similarly a first through passage 601 through the base structure 400 may have an opening defined by an edge 602 of interior sidewalls 603 (shown edge-on) of the base structure 400 that intersect (e.g., adjoin, meet) a flange mounting surface 604 of the base structure 400. By way of example, a mechanically switched permanent magnet 300 (FIG. 3) may include a flange 308 (FIG. 3) that may couple to the base structure 400 at the flange mounting surface 604 of the base structure 400. Also, by way of example, the housing 302 (FIG. 3) of the mechanically switched permanent magnet 300 (FIG. 3) may be received within the first through passage 601. According to the exemplary aspects described herein, a first distance measured between a plane coincident with the bottom surface of the flange 308 and a plane coincident with the working surface 306 may be substantially equal to a depth of the through passage 601 measured between a plane coincident with the flange mounting surface 604 and a plane coincident with the bottom surface 410 of the base structure 400. Accordingly, when the mechanically switched permanent magnet 300 is fixed to the base structure (e.g., by screws or bolts passing through the flange 308 and into mounting features 610 (e.g., threaded mounting holes defined by sidewalks of the base structure 400)), the working surface 306 of the mechanically switched permanent magnet 300 and the bottom surface 410 of the base structure 400 may lie in substantially the same plane.

Figure 7:
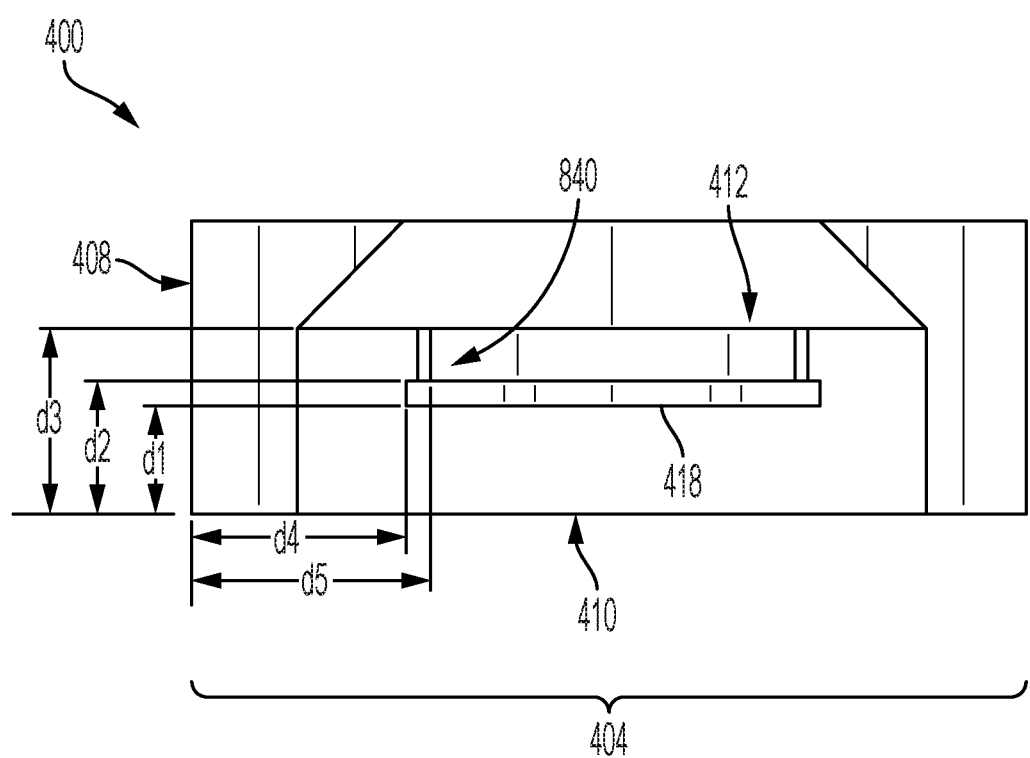
FIG. 7 is a front side elevation view of the base structure of FIG. 4, according to aspects described herein.

FIG. 7 is a front side 404 elevation view of the base structure 400 of FIG. 4, according to aspects described herein. The bottom surface 410 and the outermost edge of the left side 408 are used as datum reference surfaces or edges. As illustrated and previously described, the channel 412 includes a channel floor 418. In the exemplary aspects described herein, using the datum references depicted in FIG. 7, the channel has a depth equal to d3–d1. The channel is undercut by a distance of d5–d4. The depth of the undercut is equal to d2–d1. The undercut extends along the length of the left side, the back, and the right side of the channel 412, that is, along the length of the first interior sidewalls 424 (e.g., any one or more of 606, 608, 611 of FIG. 6). Although exemplified as a rectangular undercut, the undercut may have any profile, such as a triangular profile or a semicircular profile. Additionally, while the channel is exemplified as being undercut, the disclosure also encompasses a channel with no undercut. According to such and aspect, the cutting torch guide structure may be releasably fixed to the channel by the magnetic forces of the permanent magnet or magnets embedded in the channel floor 418. In addition to the permanent magnet or magnets embedded in the channel floor 418, the cutting torch guide structure (e.g., 202, FIG. 2) may include permanent magnets positioned on the cutting torch guide structure to be aligned with the permanent magnet or magnets embedded in the channel floor 418.

Figure 8A:
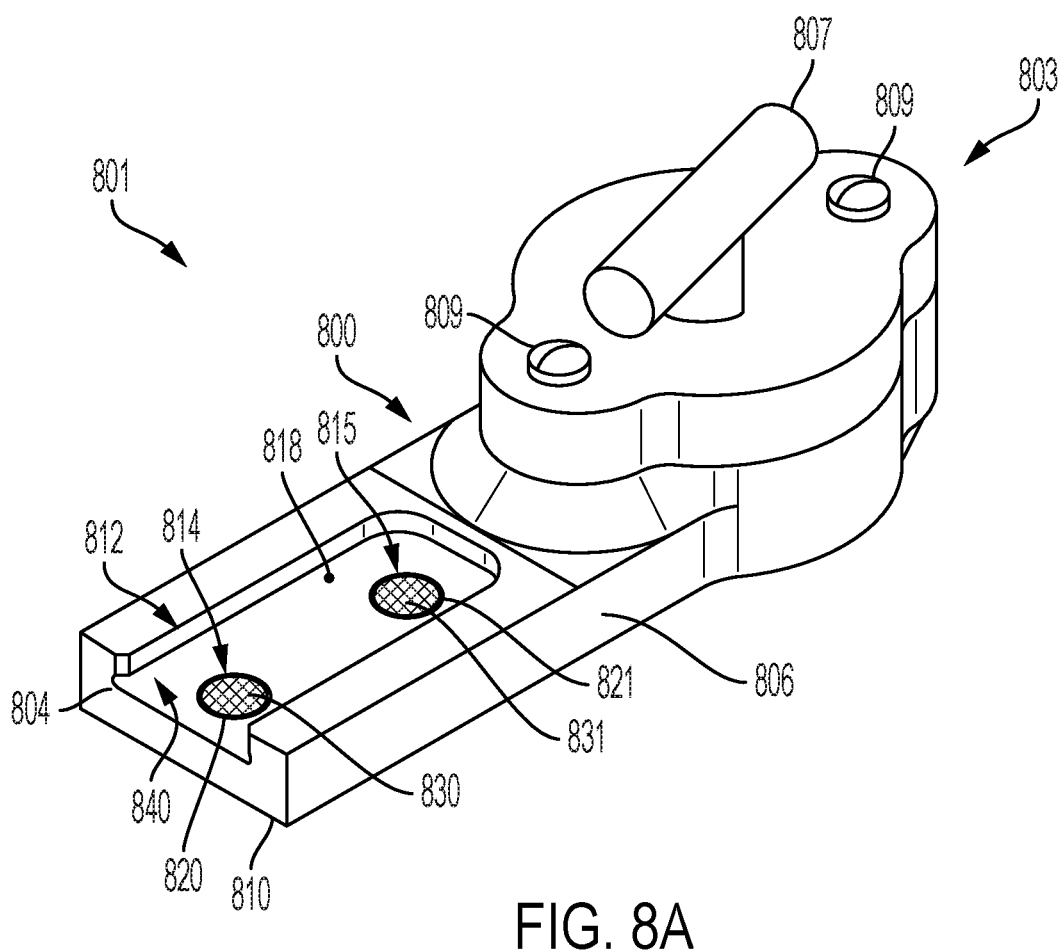
FIG. 8A and FIG. 8B are a top-front-right-side perspective view and a bottom-front-right-side perspective view, respectively, of an apparatus used to interchangeably and releasably fix a cutting torch guide structure over a metal workpiece, according to aspects described herein.
Figure 8B:
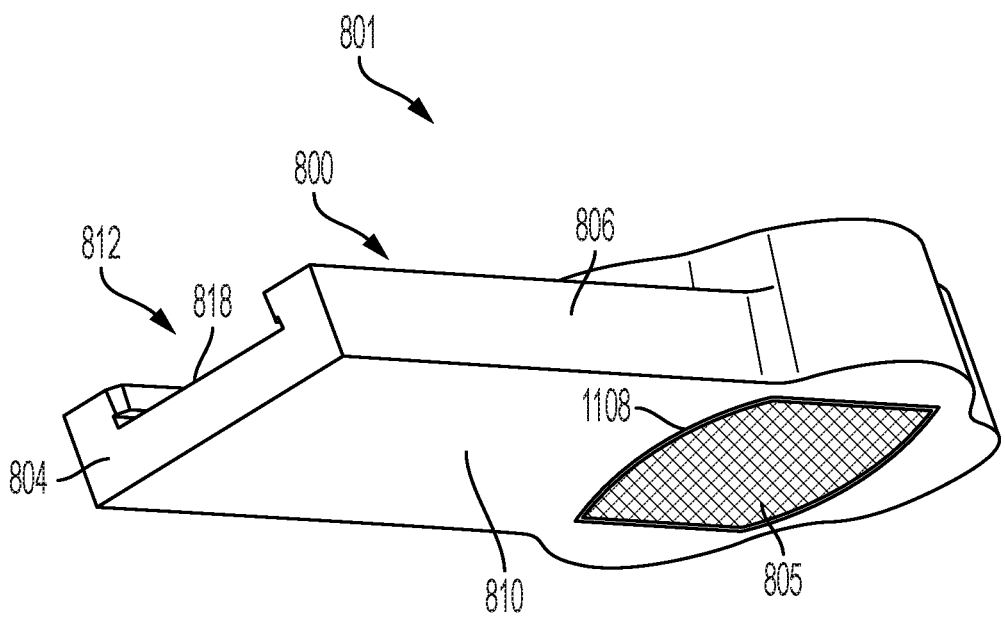

FIG. 8 is comprised of FIG. 8A and FIG. 8B. FIG. 8A and FIG. 8B are a top-front-right-side perspective view and a bottom-front-right-side perspective view, respectively, of an apparatus 801 used to interchangeably and releasably fix a cutting torch guide structure (e.g., 202) over a metal workpiece (not shown), according to aspects described herein. In the exemplary aspect of FIGS. 8A and 8B, the metal workpiece would be located under a base structure 800 and may be in contact with a bottom surface 810 of the base structure 800 and to a working surface 805 of a mechanically switched permanent magnet 803. The flange and actuating mechanism of the mechanically switched permanent magnet 803 is not sown in FIG. 8B to avoid cluttering the drawing; only the working surface 805 of the mechanically switched permanent magnet 803 is depicted in FIG. 8B.

According to one aspect, the apparatus 801 used to interchangeably and releasably fix a cutting torch guide structure (e.g., 202) over a metal workpiece (not shown) may include the base structure 800 having six sides including a front side 804, a right side 806 a top surface and an opposing bottom surface 810 (also referred to herein as a bottom surface 410). The apparatus 801 may include a mechanically switched permanent magnet 803 that may be fixed to the top surface of the base structure 800. By way of example, the mechanically switched permanent magnet 803 may be fixed to the base structure 800 using screws or bolts. Other structures or mechanisms may be used to fix the mechanically switched permanent magnet 803 may be fixed to the base structure 800. When fixed to the base structure 800, a working surface 805 of the mechanically switched permanent magnet 803 may be substantially coplanar with the bottom surface 810 of the base structure 800. According to aspects herein, the mechanically switched permanent magnet 803 may be configured to releasably fix the apparatus 801 to the metal workpiece (not shown).

The apparatus 801 may further include a channel 812 formed in and defined by first interior sidewalls 424 (e.g., any one or more of 606, 608, 611 of FIG. 6) of, and a channel floor 818 within, the base structure 800. The channel 812 may have a channel opening spaced apart from (e.g., vertically above and perpendicular to, although perpendicularity is not required) the bottom surface 810 and defined by a first edge bordering the first interior sidewalls 424 and the channel floor 818. The base structure 800 may further include at least one recess (e.g., a first recess 814, a second recess 815, or both). The at least one recess 814 (and second recess 815, if present) may be located in (e.g., formed in the base structure 800 within the perimeter of the first interior sidewalls 424 and below the channel floor 818), and positioned below the channel and may be defined by second interior sidewalls (e.g., see FIG. 4A ref. no. 416) of the base structure 800. The at least one recess 814 may have an opening to the channel 812 defined by second edge 820, 821 between the channel floor 818 and the second interior sidewalls (e.g., 416 of FIG. 4A) (e.g., at a location where the second interior sidewalls intersect the channel floor 818).

According to some aspects a depth of each of the least one recess 814 and/or the second recess 815 may be less than a distance measured at right angles between the channel floor 818 and the bottom surface 810 of the base structure 800 (e.g., a thickness of the channel floor 818).

The apparatus 801 may further include at least one permanent magnet (e.g., a first permanent magnet 830, a second permanent magnet 831, or both permanent magnets). Although the exemplary apparatus 801 of FIGS. 8A and 8B include a first permanent magnet 830 fixed to the base structure 800 in a first recess 814 and a second permanent magnet 831 fixed to the base structure 800 in a second recess 815, the disclosure contemplates a use of at least one permanent magnet. As described and illustrated in exemplary form, each permanent magnet may be fixedly received in the at least one recess 814 (and second recess 815, if present). According to some aspects, a thickness of the first permanent magnet 830 (and second permanent magnet 831, if present) may be less than a distance between the channel floor 818 and the bottom surface 810 of the base structure 800 (e.g., less than a distance measured at right angles between the channel floor 818 and the bottom surface 810 of the base structure 800 (e.g., a thickness of the channel floor 818)).

As used herein, a mechanically switched permanent magnet (e.g., 300, 803) is distinct from a first permanent magnet 830 and a second permanent magnet 831 as recited herein. In other words, a permanent magnet, a first permanent magnet, a second permanent magnet (e.g., 830, 831) are understood to identify a permanent magnet that is not mechanically switched and that is not included in a mechanically switched permanent magnet. Recitations of a permanent magnet, a first permanent magnet, a second permanent magnet (e.g., 830, 831) are made to non-switched and non-switchable permanent magnets.

According to one aspect, the channel 812 may have predefined fixed proportions (e.g., length, width, height) configured to interchangeably receive any one of a plurality of cutting torch guide structures (e.g., 202) and the at least one permanent magnet (e.g., 830, 831, or both) is configured to releasably fix the any one of the plurality of cutting torch guide structures (e.g., 202) to the base structure 800 within the channel 812. According to some aspects, each of the interchangeable plurality of cutting torch guide structures (e.g., 202) may be described as having a first portion (e.g., 902, FIG. 9) that is received within the channel 812 of the base structure 800 and a second portion (e.g., 904, FIG. 9) that overhangs and is spaced apart from the base structure 800; that is, the second portion protrudes from the channel 812 and is supported above the metal workpiece away from the base structure 800.

According to some aspects, a cutting torch used with the apparatus 801 may be at least one of an oxy-fuel cutting torch and a plasma cutting torch. According to some aspects, each of the any one of the plurality of cutting torch guide structures (e.g., 202) includes a portion that overhangs the base structure 800 and is spaced apart laterally from the base structure 800. In more detail the portion that overhangs the base structure 800 may be spaced apart laterally from the base structure 800 and may include an edge that defines (e.g., describes or matches an outline of) a predefined shape. The just mentioned edges may be configured to be slidably contacted by a cutting torch tip of the cutting torch when the cutting torch tip slides along the edge to trace the predefined shape and cut the predefined shape from the metal workpiece. In still greater detail, the edge that defines the predefined shape may be defined by at least one of interior sidewalls and exterior sidewalls of the at least one portion that overhangs the base structure 800.

According to some aspects, the base structure 800 may be formed from stainless steel (e.g., for durability in view of slag spattering onto the base structure 800 and in view of heat generated by the cutting torch and for rust prevention. The at least one cutting torch guide structure (e.g., 202) may be formed from a material that is different from the base structure 800, for example, from aluminum (e.g., for reasons that may include cost (e.g., cutting torch guide structures may be damaged and may need to be replaced and may therefore need to be made at a cost point that allows a user to comfortably purchase as many replacements as may be needed, whereas base structures may be durable and may not need to be replaced) and ease of manufacture).

According to some aspects, when fixed to the base structure 800 within the channel 812, a surface of a cutting torch guide structure (e.g., 202) may be spaced apart from the metal workpiece by the distance between the channel floor 818 and the bottom surface 810 of the base structure 800. The just recited distance may advantageously separate the cutting torch guide structure (e.g., 202) from heat generated at a workpiece surface of the metal workpiece by operation of the cutting torch.

As illustrated in FIGS. 8A and 8B, the apparatus 801 may further include an actuating structure 807 (e.g., a handle, a knob, any structure that may be gripped and rotated by hand) coupled to the mechanically switched permanent magnet 803. According to aspects herein, rotating the actuating structure 807 by a predetermined angular distance may cause the mechanically switched permanent magnet 803 to exhibit at least one of a first magnetic field strength at the working surface 805 of the mechanically switched permanent magnet 803 and a second magnetic field strength at the working surface 805 of the mechanically switched permanent magnet 803, wherein the first magnetic field strength is greater than the second magnetic field strength. In greater detail, rotating the actuating structure to produce the first magnetic field having the first magnetic field strength at the working surface of the mechanically switched permanent magnet fixes the base structure 800 to the metal workpiece and rotating the actuating structure to produce the second magnetic field having the second magnetic field strength at the working surface of the mechanically switched permanent magnet releases the base structure 800 from the metal workpiece.

According to some aspects, when applied to the apparatus 801 of FIGS. 8A and 8B, magnetic field strength at the working surface 805 of the mechanically switched permanent magnet 803 may be selected to have one of: a first magnetic field strength to fix the base structure 800 (and therefor the apparatus 801) to a metal workpiece, and a second magnetic field strength to release the base structure 800 (and therefor the apparatus 801) from the metal workpiece, and magnetic field strength at the bottom surface 810 of the base structure 800 adjacent to at least one permanent magnet (e.g., (830, 831) in or below the channel floor 818 may have a fixed third magnetic field strength that fixes the at least one cutting torch guide structure (e.g., 202) in the channel 812 to the base structure 800 and does not fix (e.g., is of insufficient magnetic field strength to fix) the base structure 800 to the metal workpiece.

According to some aspects, in conjunction with the apparatus 801, each of the any one of the plurality of cutting torch guide structures (e.g., 202) may include a corresponding permanent magnet positioned to lie adjacent to the at least one permanent magnet (e.g., 830, 831) when the each of the any one of the plurality of cutting torch guide structures (e.g., 202) is received in the channel 812. Accordingly, each of the any one of the plurality of cutting torch guide structures (e.g., 202) may include a corresponding permanent magnet configured to draw the each of the any one of the plurality of cutting torch guide structures (e.g., 202) into the channel 812 and couple to the at least one permanent magnet (e.g., 830, 831) fixed to the base structure 800 in a respective recess in (or under, or in and under) the channel floor 818

Figure 9:
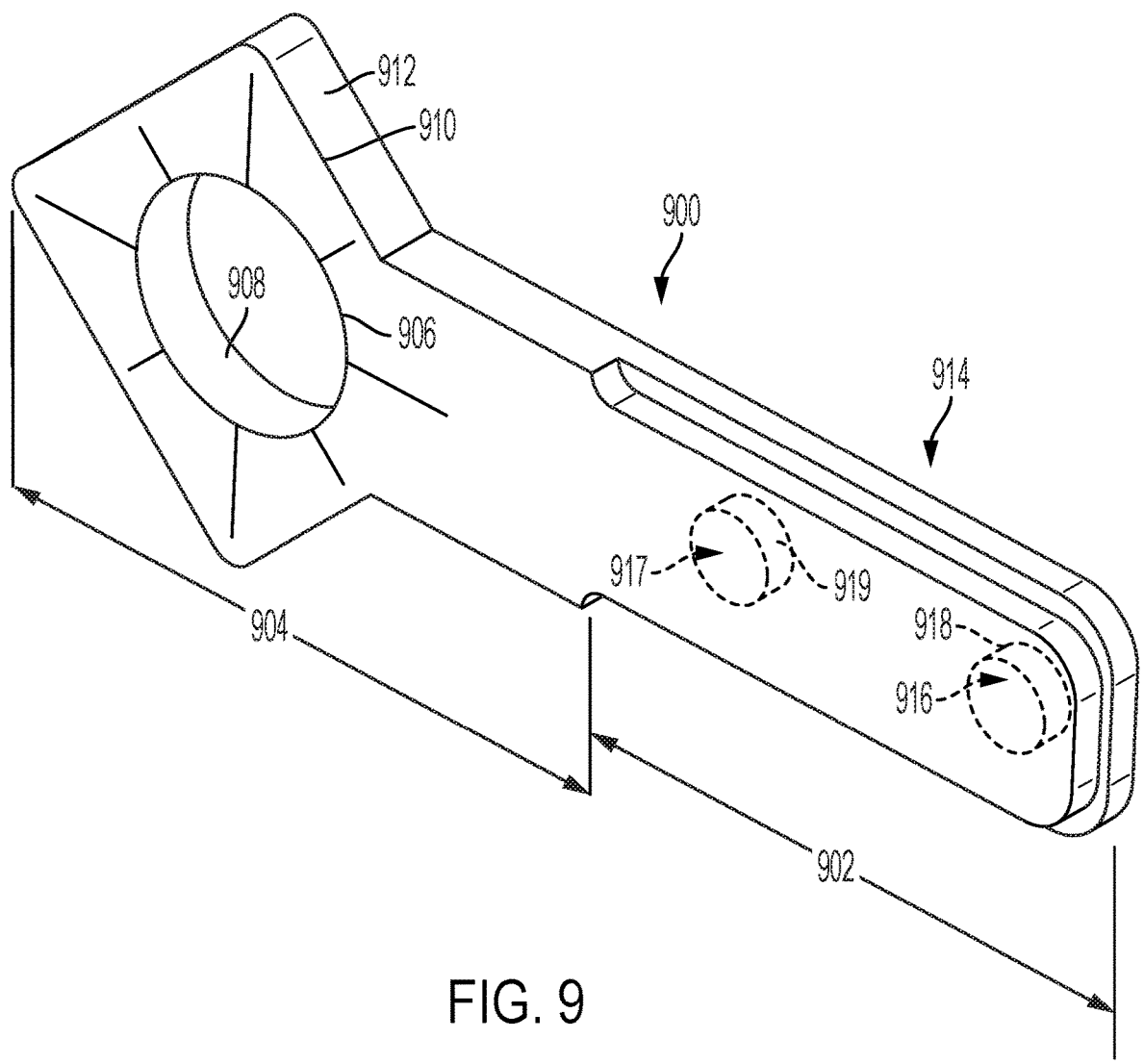
FIG. 9 is a top-front-right perspective views of a cutting torch guide structure, according to aspects described herein.

As illustrated in FIGS. 7, 8, and 9, first interior sidewalls 840 of the channel 812 may be provided with an undercut that corresponds to a given shape, and outer edges of any one of a plurality of cutting torch guide structures (e.g., 202) that are received in the channel 812 may be provided with a shape that complements (e.g., is the inverse of) the given shape. Thusly, any one of the plurality of cutting torch guide structures (e.g., 202) may be configured to slide into the channel 812 with the edges of any one of a plurality of cutting torch guide structures (e.g., 202) being received in the undercut edges of the channel 812. In greater details, the given shape may be, for example and without limitation, rectangular, triangular, or semicircular. In greater detail, the edges of the undercut in the first interior sidewalls 840 of the channel 812 may be configured to interlock with the edges of a cutting torch guide structure (e.g., 202) to maintain the cutting torch guide structure (e.g., 202) in a plane that is substantially parallel to the metal workpiece.

FIG. 9 is a top-front-right perspective view of a cutting torch guide structure 900, according to aspects described herein. The cutting torch guide structure 900 may be similar to the cutting torch guide structure 202 of FIG. 2. According to aspects described herein, the cutting torch guide structure 900 includes a first portion 902 (e.g., a first part of a whole) configured to be received in the channel (e.g., 412, 812) of a base structure (e.g., 400, 800) of an apparatus (e.g., 801) that is configured to be releasably fixed to a metal workpiece (not shown) by a magnetic field of a mechanically switched permanent magnet (e.g., 300, 803) and a second portion 904 (e.g., a second part of the whole) that overhangs the base structure (e.g., 400, 800) and is spaced apart laterally from the base structure (e.g., 400, 800). The second portion 904 includes a first edge 906 that defines a predefined shape within the borders of the second portion 904. In the exemplary illustrations of FIG. 9 and FIG. 10, the first edge 906 defines a circle. Other shapes (e.g., square, rectangle, straight or curved slot, triangle) may be defined by the first edge 906. The first edge 906 on the top surface of the cutting torch guide structure 900 (and a counterpart edge on the bottom surface of the cutting torch guide structure 900) are the upper and lower boundaries of the predefined shape that is defined by the interior sidewalls 908 of the cutting torch guide structure 900. According to some aspects, the first edge 906, or the interior sidewalls 908, or both, may be configured to be slidably contacted by a cutting torch tip (e.g., 118, FIG. 1A and FIG. 1B) of a cutting torch (e.g., 100, 110 FIG. 1A and FIG. 1B) when the cutting torch tip slides along the first edge 906, or the interior sidewalls 908, or both, to trace the predefined shape and cut the predefined shape from the metal workpiece.

According to some aspects, the cutting torch recited above may be at least one of an oxy-fuel cutting torch and a plasma cutting torch.

According to some aspects, a first edge 906 that defines the predefined shape may be defined by interior sidewalls 908, additionally or alternatively, a second edge 910 that defines a predefined shape may be defined by exterior sidewalls 912 of the second portion 904, that is, the cutting tip may slidably contact the interior sidewalls 908 of the second portion 904 or that exterior sidewalls 912 of the second portion 904 and use either or both as a template or guide.

According to some aspects, a third edge 914 of the first portion 902 may have a predetermined profile that complements (e.g., is the inverse of) a predetermined profile undercut into first interior sidewalls (e.g., 840) of a channel (e.g., 812) in the base structure (e.g., 400, 800) within which the first portion 902 is received. By way of example, the predetermined profile may be at least one of rectangular and triangular. Other predetermined profiles are within the scope of this disclosure. By forming the edges of the first portion of the cutting torch guide structure 900 to complement the edges of the channel (e.g., 812) the third edge 914 of the first portion 902 may be configured to interlock with the first interior sidewalls (e.g., 840) of the channel (e.g., 812) to maintain the cutting torch guide structure 900 in a plane that is parallel to the metal workpiece.

Also depicted in FIG. 9 are the at least one second recess 916, 917 that may be formed in the cutting torch guide structure 900. The at least one second recess 916, 917 may be open to (e.g., accessed from) the bottom surface (e.g., the bottom side) of the cutting torch guide structure 900 of FIG. 9. The at least one second recess 916, 917 may be a blind recess (e.g., a right circular cylinder shape with an open top and a closed floor). Openings of the at least one second recess 916, 917 may be defined by an edge 1020, 1021 of the interior sidewalls 918, 919 that intersect (e.g., adjoin, meet) the bottom surface of the cutting torch guide structure 900.

Figure 10:
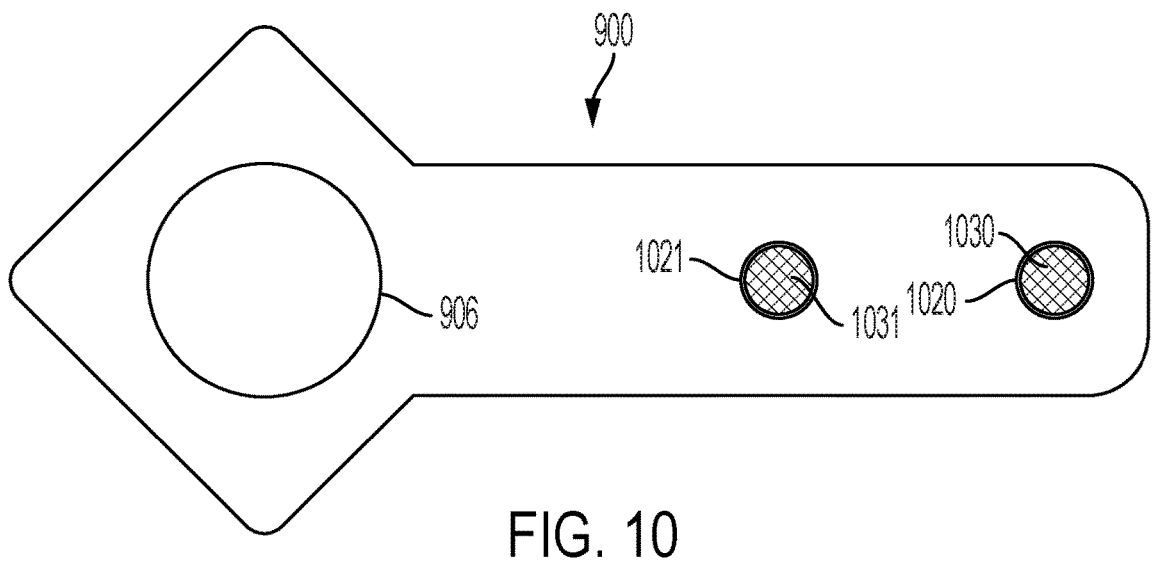
FIG. 10 is a bottom plan view of the cutting torch guide structure of FIG. 9, according to aspects described herein.

FIG. 10 is a bottom plan view of the cutting torch guide structure 900 of FIG. 9, according to aspects described herein. The cutting torch guide structure 900 may include at least one permanent magnet (e.g., a first permanent magnet 1030, a second permanent magnet 1031, or both). The at least one permanent magnet (1030, 1031) may be fixedly received in at least one second recess 916, 917 (FIG. 9), defined by interior sidewalls 918, 919 of the cutting torch guide structure 900.

A plurality of (set of two or more) cutting torch guide structures (e.g., 900) may be provided. Each of the plurality of cutting torch guide structures may have a different predefined shape, size, or both in comparison to the other ones of the plurality of cutting torch guide structures. Each may be used as a template when cutting out a predefined shape from metal workpieces. Radial lines, for example lines radiate at 45 degrees from the center of each predefined shape may be engraved or otherwise presented on and/or in a top surface of each of the plurality of cutting torch guide structures. The radial line may be a visual aid for a starting and stopping point of a cut, for example.

Figure 11:
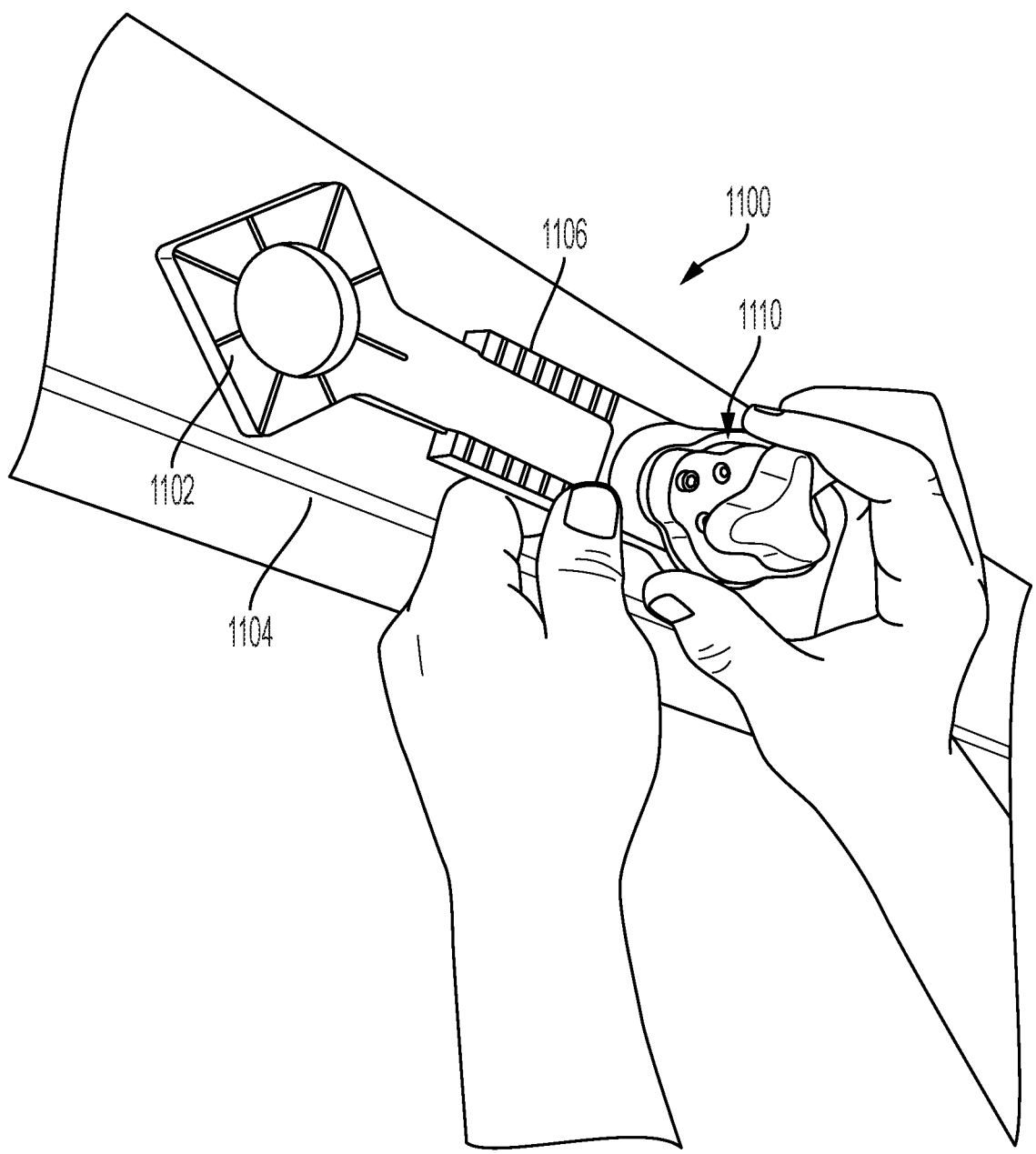
FIG. 11 depicts a system that may be configured to (and may be used to) interchangeably and releasably fix a cutting torch guide structure over a metal workpiece, according to aspects described herein.

FIG. 11 depicts a cutting torch guide system 1100 that may be configured to (and may be used to) interchangeably and releasably fix at least one cutting torch guide structure 1102 over a metal workpiece 1104, according to aspects described herein. The cutting torch guide system 1100 may include a base structure 1106.

The base structure 1106 (similar to 400, 800) may have a top surface and an opposing bottom surface and a channel (e.g., 412, 812) formed in the base structure 1106.

The cutting torch guide system 1100 may include a mechanically switched permanent magnet 1110 coupled to the base structure 1106 and configured to mechanically switch between a first magnetic state, having a first magnetic field strength that fixes the base structure 1106 to the metal workpiece 1104 and a second magnetic state, having a second magnetic field strength that releases the base structure 1106 from the metal workpiece 1104.

The cutting torch guide system 1100 may include at least one cutting torch guide structure 1102 configured to be releasably received in the channel (e.g., 412, 812) and magnetically coupled to the base structure 1106 by magnetic attraction between a first permanent magnet (e.g., 830, FIG. 8) fixed in a recess (e.g., 814) in the channel (e.g., 812) of the base structure 1106 and a second permanent magnet (e.g., 1031) fixed to the at least one cutting torch guide structure 1102 (see also 900, FIG. 9), wherein the at least one cutting torch guide structure 1102 may be configured with a first portion (e.g., 902, FIG. 9) that is removably received in the channel (e.g., 412, 812) of the base structure 1106 and a second portion (e.g., 904, FIG. 9) that overhangs the base structure 1106 and includes an edge (e.g., 906, 910, FIG. 9) or an interior or exterior sidewall (908, 912, FIG. 9) that defines a predefined shape (e.g., a circle, a square, a rectangle, a slot) and is configured to be in slidable contact with a cutting torch tip (e.g., cutting torch tip 118, FIGS. 1 and 2). According to one aspect, the edge that defines the predefined shape is defined by at least one of interior sidewalls or exterior sidewalls (908, 912, FIG. 9) of the at least one cutting torch guide structure 1102.

According to some examples, the cutting torch guide system 1100 may include, or may further include, a plurality of different cutting torch guide structures (e.g., a plurality of cutting torch guide structures similar to the at least one cutting torch guide structure 1102, yet different from each other in, for example, the internal shape and/or external shape of the at least one cutting torch guide structure 1102). According to such an example, each of the plurality of different cutting torch guide structures may be configured with a respective one a plurality of different predefined shapes. For example, the difference may include differences in diameter of the internal shape, differences in type and size of internal shape, or differences in type and size of external shape, for example.

According to some examples, the bottom surface (e.g., 410, 810) of the base structure (e.g., 400, 800, 1106) may be configured to be placed against the metal workpiece 1104. The channel (e.g., 412, 812) may be spaced apart from the bottom surface, and the second portion (e.g., 904, FIG. 9) of the at least one cutting torch guide structure 1102 may be spaced apart from the bottom surface (e.g., 410, 810) by a distance equal to, or substantially equal to, at least a floor thickness of the channel (e.g., 412, 812) to separate the at least one cutting torch guide structure 1102 from heat generated at a workpiece surface of the metal workpiece 1104 by operation of the cutting torch (see, for example, FIG. 14).

According to some aspects, the channel (e.g., 412, 812) may be formed in and may be defined by first interior sidewalls (e.g., 424 of FIG. 4, any one or more of 606, 608, 611 of FIG. 6) of, and a channel floor (e.g., 818, FIG. 8) within, the base structure 1106. In some examples, the at least one recess (e.g., 414, FIG. 4) may be defined by second interior sidewalls (e.g., 416, FIG. 4) of, and a recess floor (e.g., 422, FIG. 4) within, the base structure 1106. The recess floor (e.g., 422, FIG. 4) may be located between the channel floor (e.g., 418, FIG. 4) and the bottom surface (e.g., 410, FIG. 4).

According to some aspects, the first permanent magnet (e.g., 830, FIG. 8) may have a thickness that is less than a distance between the channel floor (e.g., 818, FIG. 8) and the bottom surface (e.g., 810, FIG. 8) of the base structure 1106. According to some examples, the channel (e.g., 812, FIG. 8)

may have predefined fixed proportions (e.g., length, width, height, edge contours) that may be configured to removably receive the first portion (e.g., 902) of the at least one cutting torch guide structure 1102.

According to some aspects of the cutting torch guide system 1100, the first interior sidewalls (e.g., 424 of FIG. 4, any one or more of 606, 608, 611 of FIG. 6) of the base structure 1106 may be configured with an undercut (see, e.g., FIG. 7) that corresponds to a given shape. For example, the shape may be square, triangular, semi-circular) and outer edges (e.g., third edge 914, FIG. 9) of the first portion (e.g., 902, FIG. 9) of the at least one cutting torch guide structure (900, 1102) may be configured with a shape that is complementary to the given shape and is received within the undercut.

Figure 13:
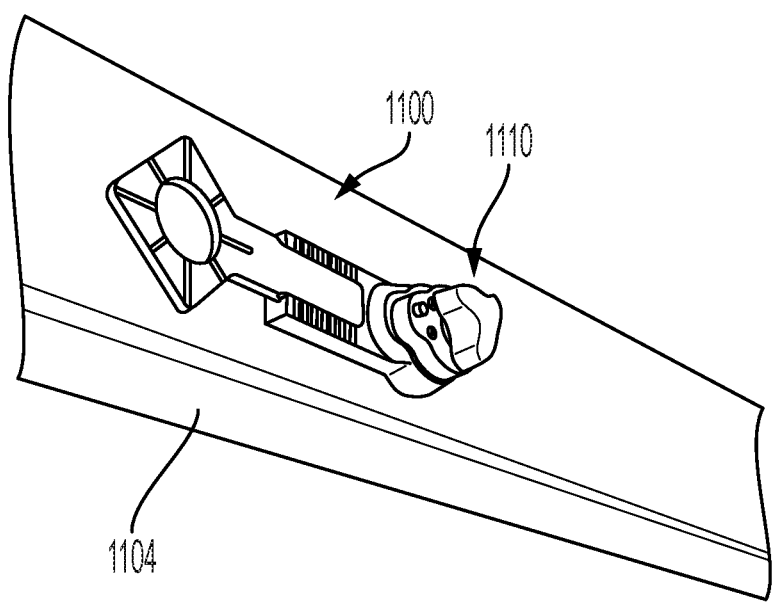
FIG. 13 illustrates the system of FIG. 11 magnetically fixed to the metal workpiece 1104 when the mechanically switched permanent magnet is in an ON state, according to aspects described herein.

According to some aspects, the outer edges (e.g., third edge 914, FIG. 9) of the first portion (e.g., 902, FIG. 9) may be configured to interlock with the undercut to maintain the at least one cutting torch guide structure 1102 parallel to the metal workpiece 1104, for example when the at least one cutting torch guide structure 1102 is received and seated in the channel and the base structure 1106 is magnetically fixed to the metal workpiece 1104 as illustrated, for example, in FIG. 13. According to some aspects, the first permanent magnet (e.g., 830, FIG. 8) fixed in the at least one recess (e.g., 414, FIG. 4) in the channel (e.g., 412, FIG. 4) of the base structure 1106 does not releasably fix the base structure 1106 to the metal workpiece 1104.

According to some aspects, a kit for a cutting torch guide system may include a base structure as exemplified in FIGS. 4-8 and a plurality of cutting torch guide structures as exemplified in FIGS. 9-10. Each of the plurality of cutting torch guide structures may include (comprises, represents) a template that is different in at least one of size and shape from another one of the plurality of cutting torch guide structures.

By way of example, and in more detail, a kit for a cutting torch guide system may include a base structure having a top surface, an opposing bottom surface, and a channel formed in and defined by first interior sidewalls of the base structure and a channel floor within the base structure, a mechanically switched permanent magnet that is fixed to the base structure, has a working surface that is substantially coplanar with the bottom surface of the base structure, and is configured to releasably fix the base structure to a metal workpiece by physical rotation of a first permanent magnet relative to a second permanent magnet therein, at least one third permanent magnet fixedly received in at least one respective recess in the base structure, a thickness of the at least one third permanent magnet is less than a distance between the channel floor and the bottom surface of the base structure, and at least one cutting torch guide structure. The at least one cutting torch guide structure may include a first portion configured to be releasably received in the channel, and a second portion that overhangs the base structure, is spaced apart laterally from the base structure, and includes an edge that defines a predefined shape, wherein the edge is configured to be slidably contacted by a cutting torch tip of a cutting torch to guide the cutting torch tip while cutting the predefined shape from the metal workpiece.

In some examples of the kit for the cutting torch guide system, the first interior sidewalls of the base structure may be configured with an undercut that corresponds to a given shape, and outer edges of the first portion of the at least one cutting torch guide structure may be configured with a shape that is complementary to the given shape and is received within the undercut. In some aspects, the outer edges of the first portion may be configured to interlock with the undercut to maintain the at least one cutting torch guide structure parallel to the metal workpiece.

As described above, FIG. 11 depicts a cutting torch guide system 1100 that may be configured to (and may be used to) interchangeably and releasably fix at least one cutting torch guide structure 1102 over a metal workpiece 1104, according to aspects described herein. In FIG. 11, the cutting torch guide system 1100 is being held spaced apart from the metal workpiece 1104. The mechanically switched permanent magnet 1110 is fixed to the base structure, but the working surface of the mechanically switched permanent magnet 1110 is not fixed to the metal workpiece 1104 and the magnetic field strength of the mechanically switched permanent magnet 1110 is such that it would not magnetically attach to the metal workpiece 1104.

Figure 12:
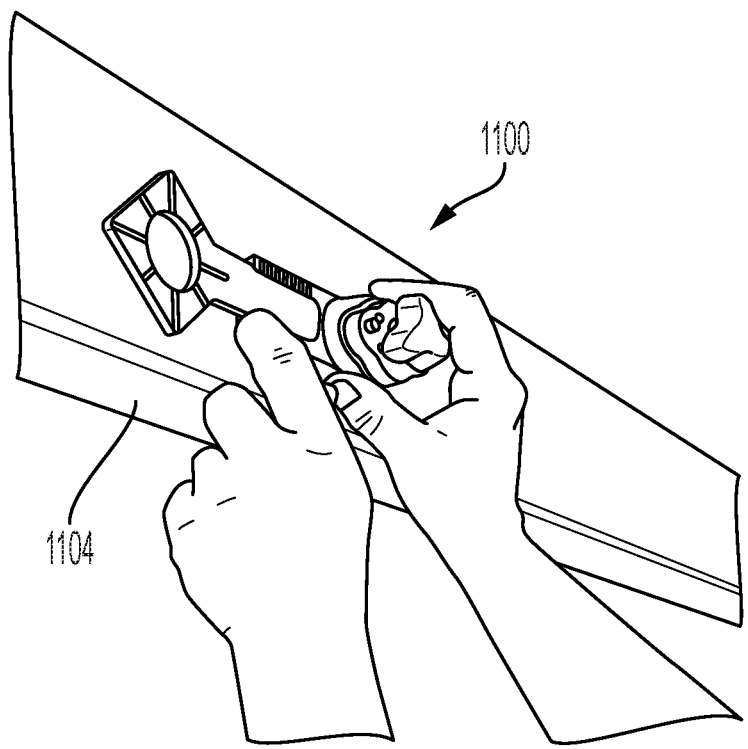
FIG. 12 illustrates the system of FIG. 11 being placed in contact with the metal workpiece and being manually held in position when the mechanically switched permanent magnet is in an OFF state, according to aspects described herein.

FIG. 12 illustrates the cutting torch guide system 1100 of FIG. 11 being placed in contact with the metal workpiece 1104 and being manually held in position when the mechanically switched permanent magnet 1110 is in an OFF state (e.g., a weak magnetic field is exhibited at the working surface of the mechanically switched permanent magnet 1110), according to aspects described herein.

FIG. 13 illustrates the cutting torch guide system 1100 of FIG. 11 magnetically fixed to the metal workpiece 1104 when the mechanically switched permanent magnet is in an ON state, according to aspects described herein. No other fixing mechanism (e.g., mechanical clamp, electromagnet) is used to hold the system in position. In the illustration of FIG. 13 the mechanically switched permanent magnet 1110 is in an ON state (e.g., a strong magnetic field (e.g., stronger than the previously recited weak magnetic field) is exhibited at the working surface of the mechanically switched permanent magnet 1110).

Figure 14:
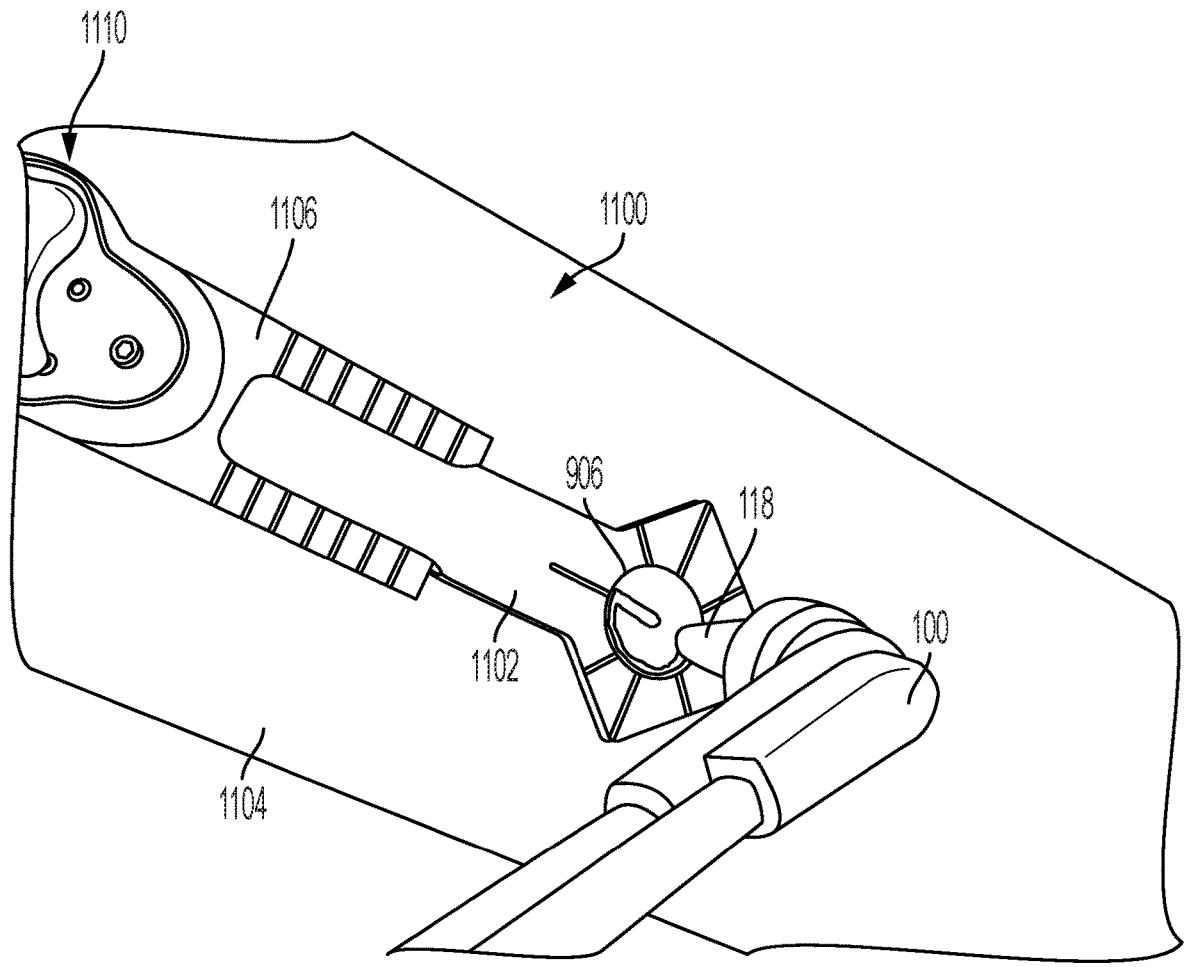
FIG. 14 depicts the system of FIG. 11 magnetically fixed to the metal workpiece during a cutting torch operation, according to aspects described herein.

FIG. 14 depicts the cutting torch guide system 1100 of FIG. 11 magnetically fixed to the metal workpiece 1104 during a cutting torch operation, according to aspects described herein. The cutting torch tip 118 of the cutting torch 100 is in slidable contact with the first edge (e.g., 906), or the interior sidewalls (e.g., 908), or both, to trace the predefined shape of the at least one cutting torch guide structure 1102 and cut the predefined shape from the metal workpiece 1104. In this example the predefined shape is a circle. The cutting torch 100 first penetrated the metal workpiece in the center of the circle of the at least one cutting torch guide structure 1102 and was then drawn outward to the 9 o'clock position, then with the cutting torch tip 118 in slidable contact with the first edge (e.g., 906) of the at least one cutting torch guide structure 1102, the user slides the cutting torch tip 118 against and around the edge, from the 9 o'clock position to the 3 o'clock position. While not shown in the drawing, the user would continue to use the edge (e.g., internal edge, first edge 906) to guide the cutting torch tip 118 from the 3 o'clock position back to the 9 o'clock position, whereupon the center portion of the metal workpiece 1104 would be blown or knocked out, leaving a well-defined and clean circular hole of a pre-determined diameter in the metal workpiece 1104.

Several aspects of cutting torch guide structures and systems have been presented with reference to an exemplary implementation. As those skilled in the art will readily appreciate, various aspects described throughout this disclosure may be extended to other cutting torch guide structures and systems.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation.

The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of a, b, or c" is intended to cover: a; b; c; a and b; a and c; b and c; and a, b, and c. A phrase referring to "a and/or b" is intended to cover: a; b; and a and b. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A cutting torch guide base, comprising:
   a base structure having a top surface and an opposing bottom surface;
   a mechanically switched permanent magnet that is fixed to the top surface of the base structure, has a working surface that is substantially coplanar with the bottom surface of the base structure, and is configured to releasably fix the base structure to a metal workpiece;
   a channel formed in and defined by first interior sidewalls of, and a channel floor within, the base structure;
   at least one recess located in the channel and defined by second interior sidewalls of, and a recess floor within, the base structure, the recess floor located between the channel floor and the bottom surface, and having an opening to the channel defined by a second edge between the channel floor and the second interior sidewalls; and
   at least one permanent magnet fixedly received in the at least one recess, a thickness of the at least one permanent magnet is less than a distance between the channel floor and the bottom surface of the base structure,
   wherein the channel has predefined fixed proportions configured to interchangeably and removably receive a first portion of any one of a plurality of cutting torch guide structures and the at least one permanent magnet is configured to releasably fix the any one of the plurality of cutting torch guide structures to the base structure within the channel.

2. The cutting torch guide base of claim 1, further comprising a cutting torch guide structure, comprising the first portion and a second portion that overhangs the base structure and is spaced apart from the bottom surface of the base structure.

3. The cutting torch guide base of claim 2, wherein the second portion that overhangs the base structure includes an edge, of at least one of: an interior sidewall, or exterior sidewall of the second portion, that defines a predefined shape and is configured to be in slidable contact with a cutting torch tip.

4. The cutting torch guide base of claim 1, further comprising a cutting torch guide structure, wherein, when releasably fixed to the base structure within the channel, a second portion of the cutting torch guide structure overhangs the base structure and is spaced apart from the metal workpiece by a distance between the channel floor and the bottom surface of the base structure.

5. The cutting torch guide base of claim 4, wherein the distance separates the cutting torch guide structure from heat generated at a workpiece surface of the metal workpiece by operation of a cutting torch.

6. The cutting torch guide base of claim 1, wherein:
   the mechanically switched permanent magnet is selected to have one of:
      a first magnetic field strength to fix the base structure to the metal workpiece, or
      a second magnetic field strength to release the base structure from the metal workpiece; and
   the at least one permanent magnet fixedly received in the at least one recess has a fixed third magnetic field strength that releasably fixes the any one of the plurality of cutting torch guide structures in the channel and does not fix the base structure to the metal workpiece.

7. The cutting torch guide base of claim 1, further comprising a cutting torch guide structure that includes a guide structure permanent magnet positioned to lie adjacent to the at least one permanent magnet when the cutting torch guide structure is received and seated in the channel.

8. The cutting torch guide base of claim 1, wherein the first interior sidewalls of the channel are configured with an undercut that corresponds to a given shape, and outer edges of the first portion of the any one of the plurality of cutting torch guide structures are configured with a shape that complements the given shape and is received within the undercut.

9. The cutting torch guide base of claim 8, wherein edges of the undercut, in the first interior sidewalls of the channel, are configured to interlock with the outer edges of the first portion of the any one of the plurality of cutting torch guide structures to maintain the any one of the plurality of cutting torch guide structures in a plane that is parallel to the metal workpiece.

10. A cutting torch guide system, comprising:
    a base structure having a top surface and an opposing bottom surface and a channel formed in the base structure;
    a mechanically switched permanent magnet coupled to the base structure and configured to mechanically switch between a first magnetic state, having a first magnetic field strength that fixes the base structure to a metal workpiece and a second magnetic state, having a second magnetic field strength that releases the base structure from the metal workpiece; and at least one cutting torch guide structure configured to be releasably received in the channel and magnetically coupled to the base structure by magnetic attraction between at least one permanent magnet fixed in a at least one recess in the channel of the base structure and a guide structure permanent magnet fixed to the at least one cutting torch guide structure, wherein the at least one cutting torch guide structure is configured with a first portion that is removable received in the channel of the base structure and a second portion that overhangs the base structure and includes an edge that defines a predefined shape and is configured to be in slidable contact with a cutting torch tip.

11. The cutting torch guide system of claim 10, wherein the edge that defines the predefined shape is defined by at least one of interior sidewalls and exterior sidewalls of the at least one cutting torch guide structure.

12. The cutting torch guide system of claim 11, further comprising a plurality of different cutting torch guide structures, wherein each of the plurality of different cutting torch guide structures is configured with a respective one a plurality of different predefined shapes.

13. The cutting torch guide system of claim 10, wherein the bottom surface is configured to be placed against the metal workpiece, the channel is spaced apart from the bottom surface, and the second portion of the at least one cutting torch guide structure is spaced apart from the bottom surface by a distance equal to at least a floor thickness of the channel to separate the at least one cutting torch guide structure from heat generated at a workpiece surface of the metal workpiece by operation of the cutting torch.

14. The cutting torch guide system of claim 10, wherein:
the channel is formed in and defined by first interior sidewalls of, and a channel floor within, the base structure;
the at least one recess is defined by second interior sidewalls of, and a recess floor within, the base structure, and the recess floor is located between the channel floor and the bottom surface;
the at least one permanent magnet has a thickness that is less than a distance between the channel floor and the bottom surface of the base structure,
wherein the channel has predefined fixed proportions configured to removably receive the first portion of the at least one cutting torch guide structure.

15. The cutting torch guide system of claim 14, wherein the first interior sidewalls of the base structure are configured with an undercut that corresponds to a given shape, and outer edges of the first portion of the at least one cutting torch guide structure are configured with a shape that is complementary to the given shape and is received within the undercut.

16. The cutting torch guide system of claim 15, wherein the outer edges of the first portion are configured to interlock with the undercut to maintain the at least one cutting torch guide structure parallel to the metal workpiece.

17. The cutting torch guide system of claim 11, wherein:
the at least one permanent magnet fixed in the at least one recess in the channel of the base structure does not releasably fix the base structure to the metal workpiece.

18. A kit for a cutting torch guide system, comprised of:
a base structure having a top surface, an opposing bottom surface, and a channel formed in and defined by first interior sidewalls of the base structure and a channel floor within the base structure;
a mechanically switched permanent magnet that is fixed to the base structure, has a working surface that is substantially coplanar with the bottom surface of the base structure, and is configured to releasably fix the base structure to a metal workpiece by physical rotation of a first internal permanent magnet relative to a second internal permanent magnet within a housing of the mechanically switched permanent magnet;
at least one permanent magnet fixedly received in at least one recess in the base structure, a thickness of the at least one permanent magnet is less than a distance between the channel floor and the bottom surface of the base structure; and
at least one cutting torch guide structure, comprising:
a first portion configured to be releasably received in the channel; and
a second portion that overhangs the base structure, is spaced apart laterally from the base structure, and includes an edge that defines a predefined shape, wherein the edge is configured to be slidably contacted by a cutting torch tip of a cutting torch to guide the cutting torch tip while cutting the predefined shape from the metal workpiece.

19. The kit for the cutting torch guide system of claim 18, wherein the first interior sidewalls of the base structure are configured with an undercut that corresponds to a given shape, and outer edges of the first portion are configured with a shape that is complementary to the given shape and is received within the undercut.

20. The kit for the cutting torch guide system of claim 19, wherein the outer edges of the first portion are configured to interlock with the undercut to maintain the at least one cutting torch guide structure parallel to the metal workpiece.

* * * * *